2,091,912

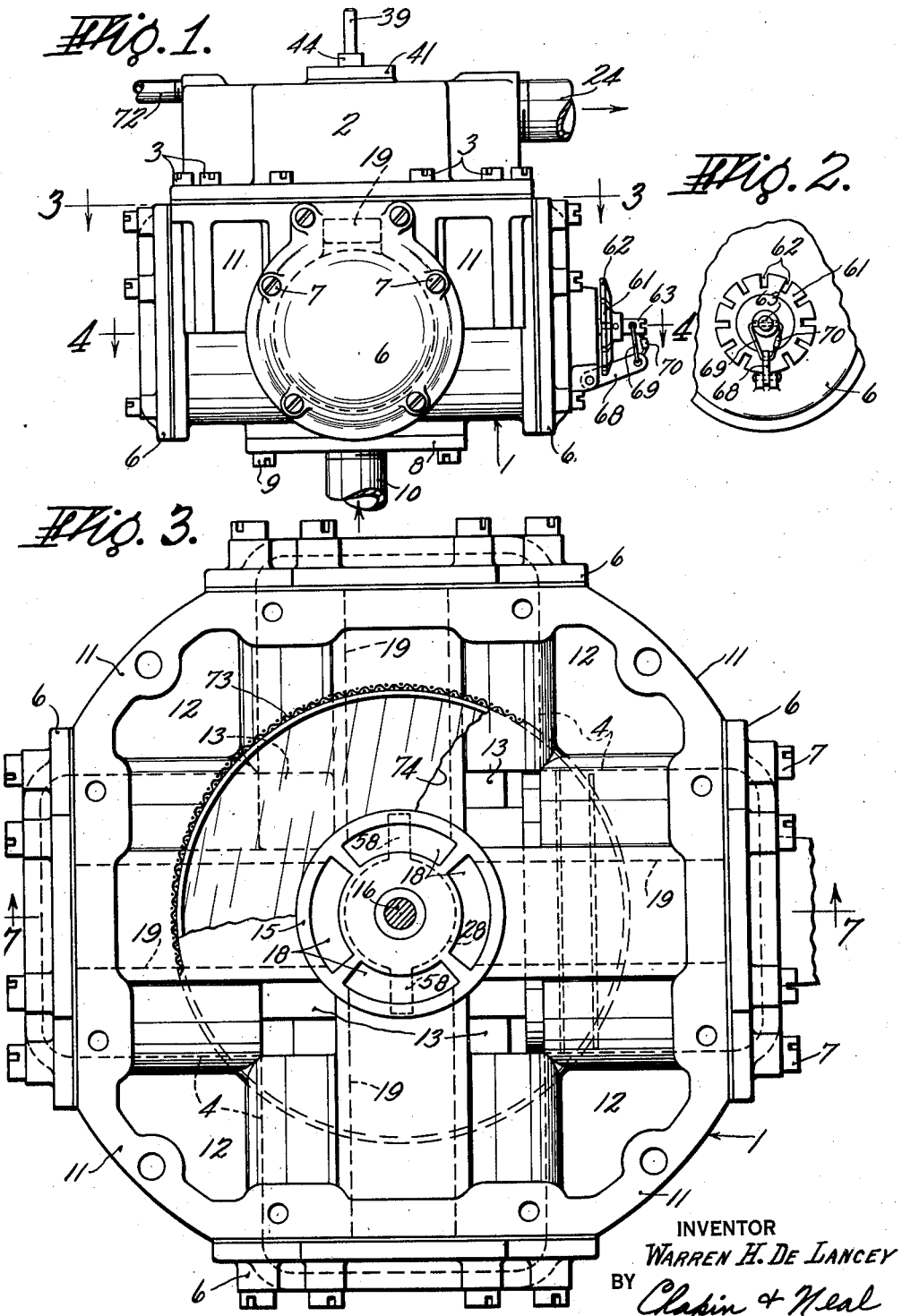
Aug. 31, 1937. W. H. DE LANCEY 2,091,912
DISPLACEMENT METER
Filed June 26, 1935 3 Sheets-Sheet 1
INVENTOR
WARREN H. DE LANCEY
BY Chapin & Neal
ATTORNEYS INVENTOR
WARREN H. DE LANCEY
BY Chapin & Neal
ATTORNEYS

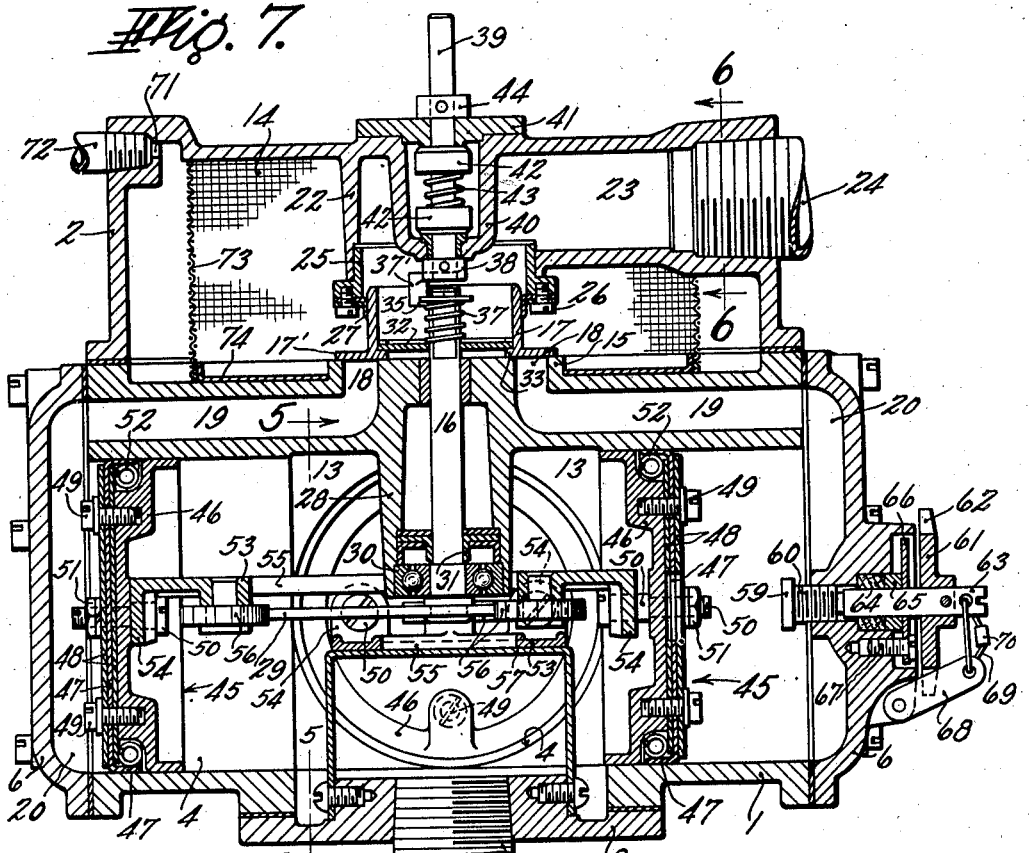
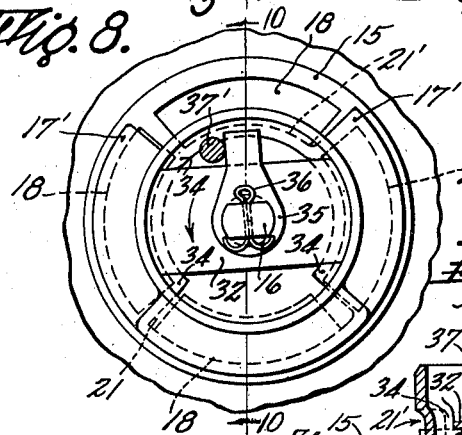
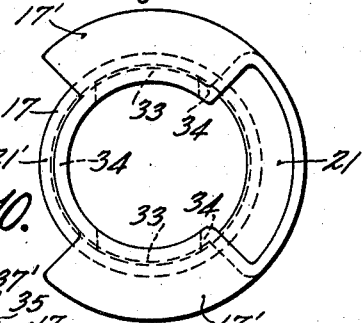
INVENTOR
WARREN H. DE LANCEY
BY
Clapin + Neal
ATTORNEYS Patented Aug. 31, 1937

UNITED STATES PATENT OFFICE 2,091,912

DISPLACEMENT METER

Warren H. De Lancey, West Springfield, Mass., assignor to Gilbert & Barker Manufacturing Company, West Springfield, Mass., a corporation of Massachusetts Application June 26, 1935, Serial No. 28,449

4 Claims. (Cl. 73—200)

This invention relates to improvements in displacement meters of the reciprocating piston type.

More particularly, the invention is directed to improvements in that type of meter wherein the measuring cylinders are arranged in a circular series in opposed pairs with all the cylinders radiating from a central chamber with which the inner ends of all the cylinders are in constant communication. The pistons in the opposed cylinders of each pair are interconnected for simultaneous movement and the plurality of pairs of connected pistons actuate, through a suitable mechanism, a rotary valve, which controls the admission of liquid to and the discharge of liquid from the cylinders, and a register drive shaft.

One object of the invention is to provide in a meter of the class described, an improved arrangement of inlet, outlet, ports and passages, characterized by their relative location which is such as to afford smooth and even flow of liquid through the casing without a tendency to trap air therein.

A further object of the invention is to combine with and incorporate into the meter structure, an effective air separating means, the central cam case of the meter being used together with an overlying valve chamber, to provide a separating chamber of adequate volume for the purpose.

These and other objects will more particularly appear as the detailed description proceeds and will be pointed out in the appended claims.

The invention will be disclosed with reference to the accompanying drawings, in which:

Fig. 1 is an exterior elevational view of the meter;

Fig. 2 is a fragmentary end view taken from the right hand end of Fig. 1;

Figure 4:
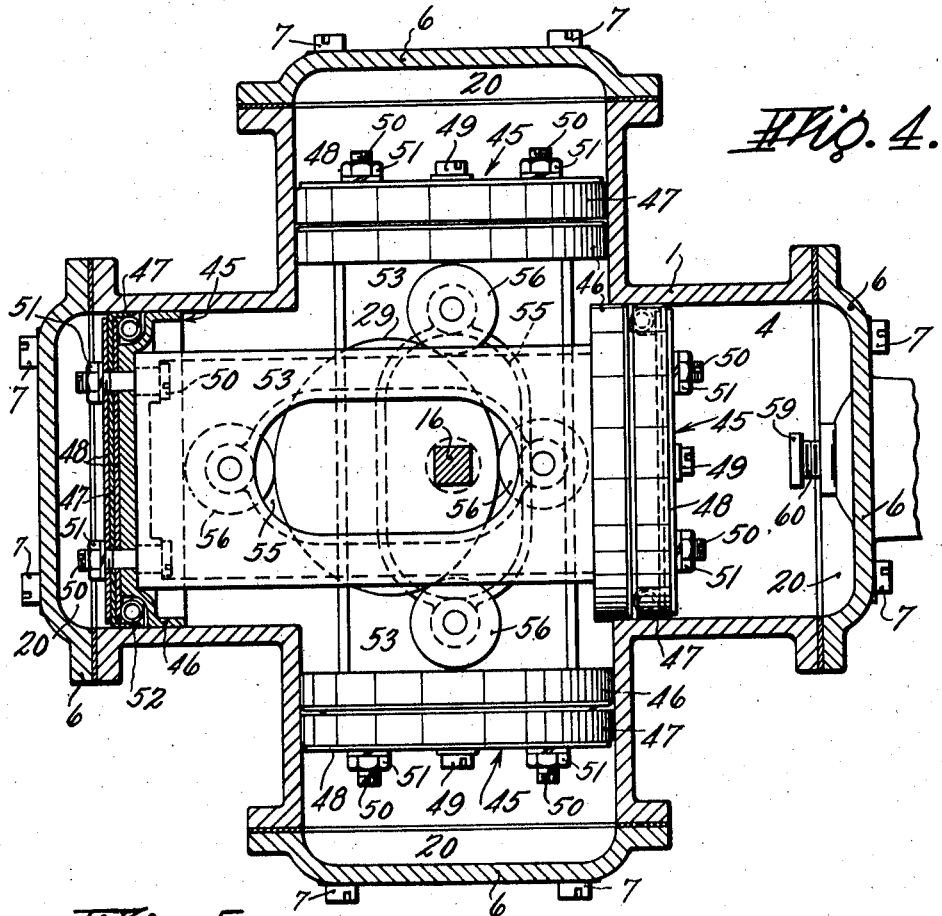
Figure 5:
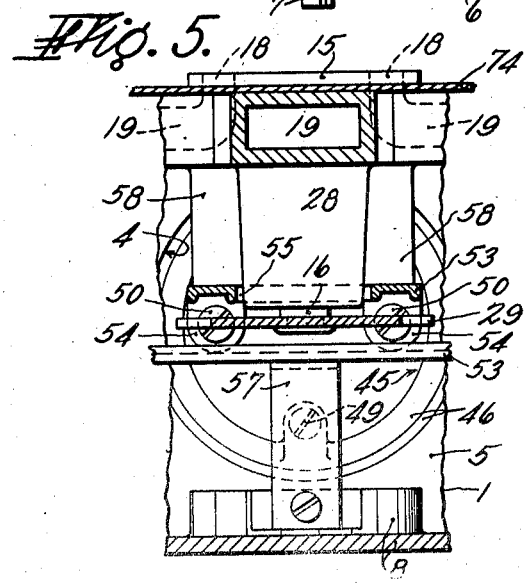
Figure 6:
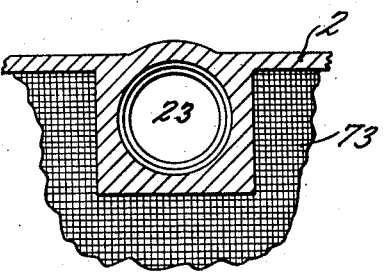

Figs. 3 and 4 are sectional plan views taken on the lines 3—3 and 4—4, respectively, of Fig. 1;

Figs. 5 and 6 are fragmentary cross sectional views taken on the lines 5—5 and 6—6, respectively, of Fig. 7;

Fig. 7 is a sectional elevational view taken on the line 7—7 of Fig. 3;

Fig. 8 is a fragmentary top plan view showing the rotary valve and the ports which it controls;

Fig. 9 is a bottom plan view of the valve; and

Fig. 10 is a sectional view taken on the line 10—10 of Fig. 8.

Referring to these drawings, the meter includes two main casing members 1 and 2 (Fig. 1), secured together as by cap screws 3. The lower member 1 (Fig. 4) is formed with a plurality of cylinders 4, radiating from a central chamber 5, with which the inner ends of all the cylinders communicate. The cylinders 4 are arranged in pairs,—there being two such pairs as shown,—and the cylinders of each pair are oppositely disposed and in axial alignment. The common axis of one pair of cylinders lies in the same horizontal plane as, but at right angles to the common axis of the other pair of cylinders. The outer end of each cylinder 4 is closed by a head 6, secured thereto by cap screws 7. The central chamber 5 is closed at its upper end, as shown in Fig. 7, and its lower end is closed by a head 8 secured to the casing 1 by cap screws 9. An inlet for the liquid to be measured is provided in head 8 in the form of a tapped hole into which the inlet pipe 10 is threaded. The member 1 is built out by walls 11 (Figs. 1 and 3) each of which interconnects the outer end of one cylinder 4 to the outer end of the next adjacent cylinder and forms a liquid-containing space 12 (Fig. 3) outside the cylinders and above a horizontal plane passing through the axes of the cylinders. Ports 13 formed in the upper peripheral walls of the cylinders 4 near their inner ends, afford constant communication between the central chamber 5 and the liquid containing space in casing member 1 outside the cylinders 4. Each port 13 is formed at the intersection of two cylinders and partly in one and partly in the other of the two cylinders. The upper casing member 2 is dome shaped and affords a chamber 14 which is filled with liquid flowing into it by way of ports 13 and the spaces 12 which form a continuation and the lower part of chamber 14.

The casing member 1 is provided on its upper wall with a centrally-disposed circular boss 15 (Figs. 3 and 7), which forms the top of chamber 5 and a division wall between the chambers 5 and 14. This boss is centrally bored to receive the vertical drive shaft 16 of a rotary valve 17 (Fig. 7) which rides on the face of the boss and controls a series of ports 18, one for each cylinder, formed in the boss. Each port communicates with a passage 19 formed in the upper wall of a cylinder 4,—such passage extending to the outer end of its cylinder and being in constant communication with the outer end thereof through the clearance space 20 formed in head 6. The valve 17 is tubular and its lower end is flanged, as at 17', for the purpose of covering the ports 18. At one side the valve is bulged out (Figs. 8, 9 and 10) to form a recess 21 of substantially the same shape as one of the ports 18 (Fig. 8), to enable liquid discharging through a port to pass by way of recess 21 into the interior of the valve. At the opposite side, the valve is bulged inwardly slightly at 21' to enable liquid outside the tubular portion of the valve to enter an opposite port 18. The flanged portion 17' is cut away at these bulged portions. The valve port, formed by the bulge 21' and the cut-away portion of flange 17', is substantially the same shape as one of the ports 18. Formed on and depending from the top wall of casing member 2 (Fig. 7) in axial alignment with the tubular valve 17 is a hollow hub 22 which communicates with one end of an axial passage 23, also formed in said wall and leading outwardly to one side of member 2 for connection to the outlet pipe 24. For convenience in manufacture, this hub 22 is extended by a separate tubular piece 25, held in place in the bore of hub 22 by a press fit. This piece 25 has a flange and secured thereto by screws 26 is the annular ring part of a packing 27, having a substantially right angular cross section. The cylindrical portion of such packing presses against the outer periphery of the tubular valve 17. The pressure of the liquid in chamber 14 being greater than that of the liquid inside the valve, forces the packing tightly against the valve to provide an effective seal.

The valve shaft 16 extends downwardly through a hollow hub 28 into the center of the chamber 5 and on its squared lower end is fixed a cam 29. An anti-friction bearing 30 is provided for shaft 16 in hub 28. Inside the hub 28 and above bearing 30 is a suitable sealing device, including a tubular packing 31, forced by liquid pressure tightly against shaft 16, to prevent liquid from the chamber 5 from passing into the discharge passage without first actuating the pistons of the meter. The upper end of shaft 16 is of non-circular form (Fig. 8) and a plate 32, which is perforated to fit such end of the shaft and thus rotates therewith, extends diametrically of and has its opposite ends resting on the ledge 33 (Fig. 10) formed by the inner portion of the flange 17' of valve 17. Each end of this plate fits between two portions 34 (Fig. 8) upstanding from ledge 33, which prevent the plate and valve from relative turning movement, and thus the valve is connected to be turned by shaft 16. Above plate 32 (Figs. 7 and 10) is an arm 35, mounted on shaft 16 in a manner similar to the plate. A pin 36 extends through the shaft above arm 35. A spring 37, encompassing the shaft, acts between plate 32 and arm 35 holding the latter against pin 36 and the former against the flange 33 of valve 17 and thus pressing the valve tightly against its seat on boss 15. The arm 35 engages the pin 37' of a crank 38, fixed to the lower end of a vertical shaft 39 (Fig. 7), aligned with shaft 16. Shaft 39 has a lower bearing in the lower end of a hollow hub 40, located within hub 22, and an upper bearing in a plate 41, secured to the top wall of casing member 2 and closing the upper end of the bore of hub 40. Seal rings 42, mounted on shaft 39, are pressed by a spring 43 against the adjacent end faces of the lower and upper bearings to prevent escape of liquid around the shaft. A collar 44, fixed to shaft 39, serves in conjunction with the hub of crank 38, to hold shaft 39 against axial displacement. This shaft is adapted for connection to the drive shaft of a register which indicates the quantity of liquid passing through the meter.

The shaft 16 is driven by pistons 45 reciprocating within the described cylinders. These pistons may be of any suitable construction. As shown herein, each consists of a circular body 46 (Fig. 4) of metal and a cupped piston leather 47, the circular part of which is mounted between two circular metal discs 48 and clamped against the outer end face of the body. This clamping is effected in part by cap screws 49 and in part by studs 50 and nuts 51. A coil spring 52, bent into circular form and mounted in a groove in the piston body, presses the flanged part of the piston leather against the cylinder wall.

Each pair of pistons in opposed cylinders are interconnected by plate 53, having lugs 54 (Fig. 7) to abut the body 46 of each piston. The studs 50 pass through these lugs and hold the plates to the pistons. The two plates 53 cross one another and are mounted one above the other on opposite sides of cam 29, (Figs. 5 and 7). The two plates are duplicates but one is inverted with respect to the other so that the lugs 54 of one project upwardly and the lugs of the other project downwardly. Each plate has a slot 55 and this slot of the upper plate receives hub 28 and allows free sliding movement of the upper plate throughout its normal range of movement. Each plate 53 carries two rolls 56 to engage cam 29 at diametrically opposite points. The arrangement is that of a positive motion cam, only in this case the cam is positively driven in both directions by the piston-actuated rolls 56. Thus, the reciprocating movement of the pistons is converted into rotary movement to drive the valve 17 and the shaft 39, which operates the register.

Means are provided to prevent the pistons 45 from turning in their cylinders and thus displacing the rolls 56 on their plates 53 from proper position with respect to cam 29. In the case of the lower plate 53, its flat lower face is engaged throughout its width (Figs. 5 and 7) by the horizontal cross bar portion of a plate 57, of inverted U form. The vertical legs of this plate are secured at their lower ends to the cover plate 8. In the case of the upper plate (Figs. 3 and 5), webs 58 are built out at diametrically opposite points on hub 28 and the lower ends of these webs engage the flat top face of the plate on opposite sides of its center line, as shown in Fig. 5.

In order to vary the quantity of liquid discharged in one cycle of operation of the meter for the purposes of adjustment to secure an accurately measured quantity, the stroke of one piston is made variable. This one piston is the right hand one shown in Fig. 7. It will be noted that the length of that portion of each stud 50 which passes through lugs 54 of this one piston, is greater than the thickness of the lugs, whereby this piston is free for a limited degree of longitudinal movement with respect to plate 53 and its companion piston. Liquid entering the chamber 5 or cam case, spreads the pistons apart so that a space exists between the right hand piston and its lugs 54, as this piston moves to the right. A stop 59, fixed to the inner end of a screw 60, threaded into the right hand cylinder head 6, is adapted to be engaged by the body 46 of the right hand piston to limit the stroke of the latter. The central portion of the piston leather 47 and its retaining plates 48 are cut away to allow stop 59 to thus engage the piston body. This stop may be adjusted to arrest the right hand piston before its companion and left hand piston has completed its stroke. The right hand piston will engage stop 59 and come to rest while the left hand piston can continue to move until the lugs 54 of the right hand piston abut the body thereof. On the return and intake stroke of the right hand piston, the body 46 and lugs 54 move together in abutting relation and become spread apart again at the start of the discharge stroke of the right hand piston. In this way, the right hand piston, if not arrested by stop 59, would have a stroke greater than the left hand piston. That is, it can start on its discharge stroke before the left hand piston and move relatively to it until the heads of studs 50 abut the lugs and thereafter it can move the same distance as the left hand piston. Thus, a somewhat greater quantity of liquid can be taken into and subsequently discharged from the right hand cylinder than is the case with the left hand cylinder. But this greater quantity can be reduced by various degrees by adjustment of stop 59 to arrest the right hand piston before it completes its maximum possible stroke.

For convenience in adjusting the stop 59, a disc 61, having a circular series of radial slots 62 in its periphery (see also Figs. 1 and 2), is located outside head 6 and fixed to a smooth cylindrical stem 63, which forms an extension of the screw 60. A stuffing box is provided to prevent escape of liquid past stem 63. In this case, the stuffing box consists of packing 64 and a cooperating gland 65, set into a recess in head 6, the gland being pressed inwardly through the intermediary of a plate 66 by a series of screws 67 threaded into the head. The disc 61 is held in its various positions of adjustment by engaging a link 68 in one of the slots 62. This link is pivoted at one end to head 6 and its other end is perforated to receive a wire 69 which is also passed through a hole in stem 63. The wire is drawn up to hold the link engaged in its slot and the ends of the wire are then fastened by a seal 70. The arrangement is such that the turning of disc 62 through an angle equal to that between the center lines of two adjacent slots 62, will effect a predetermined variation in the quantity discharged, say for example, one-half of a cubic inch. If turned one notch in one direction, the quantity discharged on one cycle of operation of the meter will be increased by one-half of one cubic inch and if turned one notch in the other direction an equal decrease will be effected in said quantity.

The meter casing, or more particularly, the cam case 5 and chamber 14 with its spaces 12, is intended to be utilized as an air separator, the air or gas bubbles in the liquid rising to the top of chamber 14, where they escape through a small port 71 (Fig. 7) by way of an outlet pipe 72. This pipe 72 may lead to any suitable point for the escape of the air and vapor but usually it has interposed therein a suitable trap for such liquid as may escape with the air and/or gas through port 71, as shown for example in my Patent No. 1,941,390, dated Dec. 26, 1933. It is contemplated that liquid and air or gas escaping from pipe 72 may be treated as in the air separator disclosed in said patent. However, the separator chamber of such air separator is dispensed with and the aforesaid parts of the meter casing are utilized as the separator chamber. The air escape port 71, as shown and preferred, is constantly open but of relatively small area. But the invention does not depend on this arrangement.

To secure increased effectiveness of separation, I prefer to provide in chamber 14 a metal screen 73 of fine mesh, which screen will allow the passage of liquid therethrough but will prevent the passage of air bubbles. As shown in Fig. 3, this screen is cylindrical and at its lower end is fixed to a circular plate 74 (see also Fig. 7) which fits around the central boss 15 and rests upon the top walls of the several conduits 19. This screen extends from plate 74 upwardly to and in contact with the top wall of casing member 2, being cut to fit tightly around the wall of outlet passage 23, as shown in Fig. 6. It will thus be seen that the screen 73 divides off chamber 14 into an inner annular space in which is located the ports 18 and valve 17 and an outer annular space, which communicates from below with the cam case 5 by way of ports 13 and at its extreme upper end with the air escape port 71. Only air free liquid can reach the valve and its ports and pass to the measuring cylinders 4. The plate 74 is large enough in diameter to overlie the ports 13, so that liquid rising therethrough is deflected radially outwardly and caused to rise outside the screen 73. The plate 74 forces the liquid to sweep through and traverse the spaces or pockets 12. Parts of the ports 13 are very low down and practically at the same level as the base of pockets 12. Hence, some liquid would naturally flow more or less horizontally outward across the floors of the pockets, so that there is no chance for any trapping of air in these pockets.

The operation of the meter will next be described. Liquid is supplied under pressure to pipe 10 by a pump or any other suitable means. Normally pipe 10, the entire meter casing, and outlet pipe 24 are filled with liquid and no movement of the pistons occurs until the valve which usually controls the outlet of pipe 24 is opened. Assuming that the outlet valve is opened and that the parts occupy the positions illustrated, the pressure in pipe 24, inside valve 17 and in the outer ends of the lower and the right hand cylinders 4 (as viewed in Fig. 4) as well as in the ports 18 and passages 19 associated with such cylinders, becomes less than the pressure in the chamber outside valve 17 and in the left hand and upper cylinders 4 together with their passages and ports. The pressure in cam case 5 acts equally but in opposite directions on the pistons of each pair and thus does not tend to move the pistons. It will be noted that the piston of the upper cylinder is about midway of its stroke and that the piston in the left hand cylinder is at the extreme outer end of its stroke. From Fig. 8 it will be seen that the valve 17, moving in the direction of the arrow, has just cracked open one port 18 for the admission of liquid to the left hand cylinder and that the opposite port 18 has similarly been just cracked open for the discharge of liquid from the right hand cylinder. The other ports are wide open for the admission of liquid to the upper cylinder and for the discharge of liquid from the lower cylinder. The upper piston through its roll 56 will turn cam 29 in a counter-clockwise direction and this will move the left hand piston to carry it past the dead center position shown. Then the left hand piston moves to the right and the upper piston continues its downward movement and the other pistons, respectively connected thereto, force out from their cylinders the liquid previously drawn into them. The cam 29 is thus turned and with it the shaft 39 of the register and the valve 17. The action continues until the upper piston reaches the lower end of its stroke by which time the valve 17 has turned far enough to cut off the upper port 18 from chamber 14, to open wide the left hand port 18 to chamber 14, and to open wide the right hand port 18 to the recess 21 of valve 17. The valve is also positioned to just barely open the upper port 18 to recess 21 and the lower port to the chamber 14. The left hand piston continues its stroke to the right (being at this time about midway in such stroke) and its action on the cam 29 moves the lower piston over dead center position. The lower piston moves upwardly and the upper piston discharges liquid adding to the discharge from the right hand cylinder. This action continues until the right hand piston reaches the outer end of its stroke, when valve 17 will have been moved far enough to connect the right hand cylinder to the chamber 14 and the left hand cylinder to the discharge. Then the right and left hand piston move to the left and the other pistons continue their upward stroke, eventually completing it at about the time the first named pistons are midway in their travel to the left. Then the valve 17 will have moved far enough to enable liquid to flow into the upper cylinder and discharge from the lower cylinder and the connected upper and lower pistons commence to move downwardly while the other pistons complete their stroke to the left. The upper and lower pistons are then midway in their downward stroke and one cycle of operation has been completed.

The contour of cam 29 is specially designed as to secure uniform discharge during equal angular intervals of rotation of the register shaft. The two pairs of connected pistons are forced to move in such relation that the sum of the displacements of the two pistons, which are discharging, for equal angular intervals of movement of the cam 29 is a constant. For example, the lower piston is midway in its discharge stroke and the right hand piston is just starting its discharge stroke. In the next ten degree movement of cam 29, the right hand piston will move .004 inch, while the lower piston will move .162 inch,—the total being .166 inch. In the next succeeding ten degree movement of cam 29, the right hand piston will move .023 inch and the lower piston .143 inch,—the total being as before .166 inch. For succeeding intervals of like degree, the sum of the movements of the two pistons which are discharging, is equal to the same constant, viz. .166 inch. The figures are given not as limitations but merely as illustrative of how the cam contour is plotted. By this arrangement it is insured that the register will at all times truly indicate the quantity discharged, since for each angular increment of the movement of its drive shaft equal quantities of liquid are discharged.

The relative locations of the inlet, outlets and various ports of the meter are considered important in that they enable a smooth flow of liquid through the meter and avoid any possibility of trapping air. Liquid enters at the very bottom of the meter casing and rising, fills the cam case 5 and the exposed inner ends of cylinders 4. From the cam case, the liquid passes upwardly through the equally spaced ports 13 in both a horizontally outward as well as a vertically upward direction. In part, the liquid sweeps across the floor of the recess 12 and meeting the outer walls 11 is deflected right and left to sweep up over the rounded upper parts of the outer walls of cylinder 4. The rising liquid meets the plate 74 and is deflected outwardly, to rise with other portions of the liquid into the annular space outside screen 73. Then the liquid passes radially through the screen into the interior part of chamber 14,—the entrapped air in the form of bubbles being retained by the screen in the outer part of chamber 14 to rise to the top thereof and escape through port 71 and pipe 72. Liquid from an elevation substantially below the top of the casing, and thus at a location removed from that where air collects, is taken off through some of the ports 18 and passages 19 to cylinders 4, while at the same time liquid forced out of other cylinders flows inwardly through other passages 19 and upwardly through the associated ports 18 into the interior of valve 17 to pass into the outlet 23 and pipe 24. A smooth, even flow of liquid through the meter is thus secured and one calculated to avoid the trapping of air at any part of the meter casing.

The arrangement is also advantageous for the work of air separation. The separating chamber needs to have a substantial capacity. A large volume means a reduction in the velocity of the liquid which affords time for the air bubbles to separate out of the liquid and rise to the top of the chamber 14. Here, the volume of the cam case and such portions of the cylinders 4 as communicate therewith, is added to the volume of the valve chamber 14,—the whole affording a separating chamber of adequate volume for the work in hand. The valve 17, being located below the top of chamber 14, leaves a space of adequate volume above it for the accumulation of air. In the arrangement shown, the screen 73 is used to insure, as far as possible, that air will not pass to the measuring cylinders. The arrangement, however, is such that the separating action can occur if the screen is omitted. The screen naturally affords additional insurance of the effectiveness of the air separation and is therefore desirable, important and preferred even if it is not indispensable.

The invention thus affords an improved meter, characterized in that it may also be utilized efficiently as an air separator and in that it enables smooth even flow of liquid free of any tendency to trap air.

What I claim is:

1. A meter, comprising, a casing having a plurality of cylinders, pistons reciprocable in said cylinders, a valve for controlling the passage of liquid to and from the cylinders, said casing having a lower chamber located between said cylinders and communicating with the inner end of each cylinder, means in said chamber for actuating said valve from the reciprocating pistons, said casing having an inlet for liquid formed in its bottom wall and opening into said chamber and having a second chamber above the first chamber with a central division wall between the chambers, said casing having openings enabling constant communication between said chambers, and an outlet for air at the upper part of the second chamber, a plate mounted on said wall and overlying said openings to deflect liquid rising therethrough from the lower chamber to the outer part of the upper chamber, and a screen extending between said plate and the top wall of the casing and dividing the second chamber into inner and outer parts in one of which said air outlet is located and in the other of which said valve is located but at a level below that of said air outlet, said casing having a discharge passage for liquid leading upwardly from said valve.

2. A meter, comprising, a casing having a plurality of cylinders radiating from a central chamber with which the inner ends of all the cylinders communicate and a second chamber above the first and above the cylinders separated from the first chamber by a central division wall, a valve rotatably mounted on said wall, a shaft for the valve extending through the wall into the lower chamber, pistons reciprocable in said cylinders connected to turn said shaft, the upper wall of each cylinder having a longitudinal passage formed therein extending from the outer end of its cylinder to said central wall and said passages terminating in a circular series of ports adapted to be controlled by said valve, the walls of said cylinders having openings therethrough enabling constant communication between the lower and upper chambers, said casing having a discharge passage formed in its top wall and including a tubular part depending toward said valve, said valve having an upwardly extending part telescoped in the first named tubular part and rotatable relatively thereto, and a screen in the upper chamber surrounding the valve whereby liquid must pass through the screen to reach the valve and the ports which it controls, said casing having an outlet for air communicating with the upper part of the upper chamber outside said screen.

3. A meter, comprising, a casing having a plurality of cylinders, pistons reciprocable in said cylinders, a valve for controlling the passage of liquid to and from the cylinders, said casing having a lower chamber located between said cylinders and communicating with the inner end of each cylinder, means in said chamber for actuating said valve from the reciprocating pistons, said casing having an inlet for liquid opening into said chamber and having a second chamber above the first chamber with a central division wall between the chambers, said casing having openings enabling constant communication between said chambers, and an outlet for air at the upper part of the second chamber, a plate mounted on said wall and overlying said openings to deflect liquid rising therethrough from the lower chamber to the outer part of the upper chamber, and a screen dividing the second chamber into inner and outer parts in one of which said air outlet is located and in the other of which said valve is located but at a level below that of said air outlet, said casing having a discharge passage for liquid leading upwardly from said valve.

4. A meter, comprising, a casing having a plurality of cylinders, pistons reciprocable in said cylinders, a valve for controlling the passage of liquid to and from the cylinders, said casing having a lower chamber located between said cylinders and communicating with the inner end of each cylinder, means in said chamber for actuating said valve from the reciprocating pistons, said casing having an inlet for liquid opening into said chamber and having a second chamber above the first chamber with a central division wall between the chambers, said valve being located in the central and lower part of the second chamber, said casing having openings enabling constant communication between said chambers, and an outlet for air at the upper and outer part of the second chamber, and a plate mounted on said wall and overlying said openings to deflect liquid rising therethrough from the lower chamber to the outer part of the upper chamber, and away from the lower central part of the second chamber where said valve is located.

WARREN H. DE LANCEY.